March 19, 1963 H. HECHT ET AL 3,082,388
ELECTROMAGNETIC SIGNAL GENERATOR
Filed Jan. 3, 1956 2 Sheets-Sheet 1
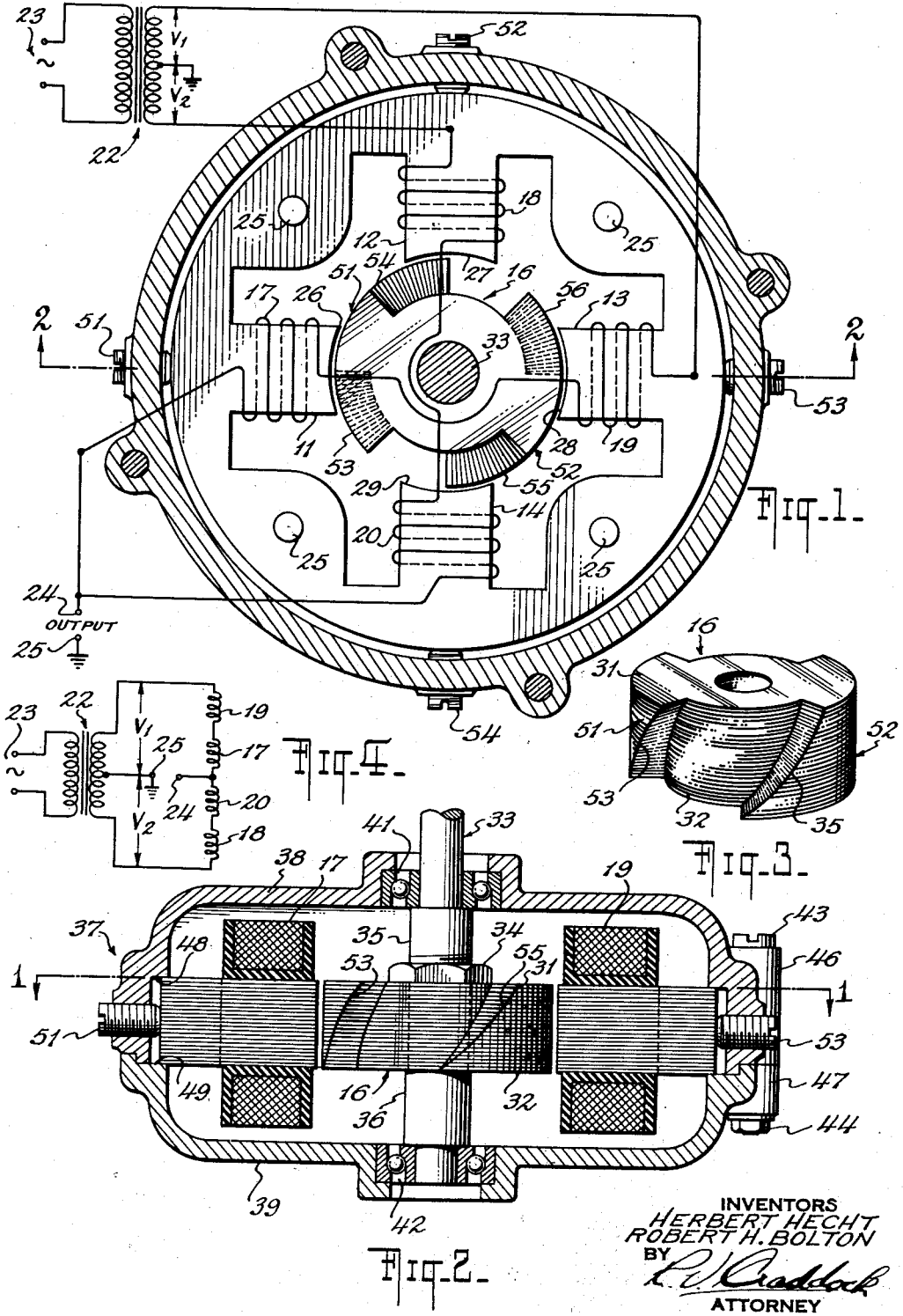
INVENTORS
HERBERT HECHT
ROBERT H. BOLTON
BY
ATTORNEY March 19, 1963 H. HECHT ET AL 3,082,388
ELECTROMAGNETIC SIGNAL GENERATOR
Filed Jan. 3, 1956 2 Sheets-Sheet 2

INVENTORS
HERBERT HECHT
ROBERT H. BOLTON
BY
ATTORNEY

United States Patent Office 3,082,388
Patented Mar. 19, 1963

3,082,388
ELECTROMAGNETIC SIGNAL GENERATOR
Herbert Hecht, Wantagh, and Robert H. Bolton, Riverhead, N.Y., assignors to Sperry Rand Corporation, a corporation of Delaware
Filed Jan. 3, 1956, Ser. No. 557,104
3 Claims. (Cl. 336—135)

The present invention relates to electromagnetic signal generator devices for providing an electrical output which is a function of mechanical input data supplied thereto.

There are many types of electromagnetic signal generator devices known in the art used as a pick-off for providing a voltage output whose amplitude is a linear function of the angular rotation of a magnetic armature or rotor from a null position relative to a magnetic stator. Generally such devices have a limited angular range of armature rotation over which an unambiguous usable output is obtained. One such device is described in copending U.S. application Serial No. 460,001 filed by R. H. Bolton on October 4, 1954, and assigned to the same assignee as the present application, wherein the range is limited to approximately ±20° from an armature null position. Other types of electromagnetic pick-off devices known in the art have even a smaller range.

It is an object of the present invention to provide an electromagnet signal generator device for producing an output voltage signal whose amplitude is a predetermined function of relative displacement between an armature and stator over a wide range.

It is a further object of the present invention to provide an electromagnetic signal generator device as aforedescribed for providing an output voltage signal whose amplitude is substantially a sinusoidal function of the angular rotation of a rotor relative to a stator thereof.

It is yet another object to provide an electromagnetic pick-off device for producing a signal voltage output whose ampltiude approximates a sine wave function of rotor displacement with the device providing an unambiguous signal voltage output over ±45° of rotor displacement from a null position, the phase of the signal voltage output reversing with a change in rotor position from one side to the other of said null position.

The foregoing and other objects and advantages of the present invention are attained by providing an electromagnetic pick-off device comprising a plurality of inductance coils arranged in a pick-off circuit and disposed about a plurality of arms of a magnetically permeable stator. The stator has at least one pair of poles and curved pole face means extending towards said rotor with said rotor having at least one pole face means adjacent said pair of pole face means of said stator. Each pole face means of said rotor is curved and substantially coaxial with said stator pole face means, the angularly displaced edges of the rotor pole face means transverse the axis of the device being skewed relative to the edges of the pole face means of the stator. When the rotor is angularly displaced relative to the stator, the reluctances of the magnetic paths for the coil fields change in such a way that the pick-off circuit provides an output voltage whose magnitude varies as a sinusoidal function of rotor displacement over a wide angular range.

Referring now to the drawings,

FIG. 1 comprises a first view of the pick-off device, partially in cross section, and is taken along the line 1—1 of FIG. 2;

FIG. 2 is a further view of the pick-off device, partially in cross section, and is taken along the line 2—2 of FIG. 1;

FIG. 3 is a perspective view of the rotor of the pick-off device shown in FIGS. 1 and 2;

FIG. 4 is a circuit diagram for schematically showing the connections of the stator coils of the pick-off circuit of FIGS. 1 and 2;

Figure 5:
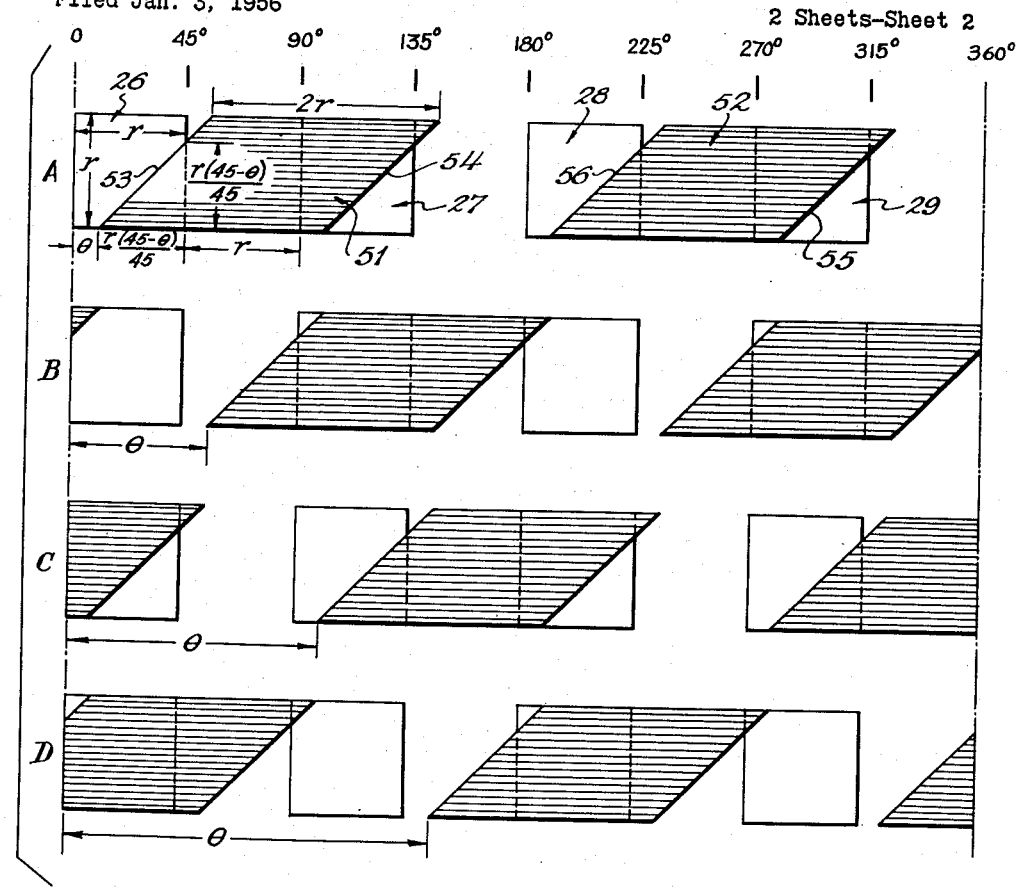
FIG. 5 is a developed view of the stator and rotor of the pick-off device of FIGS. 1 and 2 for showing various positions of the rotor relative to the stator.

The signal generator or pick-off device shown in FIGS. 1–3 comprises a stator having four inwardly extending arms or poles 11–14, armature means comprising a rotor 16, substantially concentrically disposed within the stator, and four similar inductance coils 17–20 disposed about the poles 11–14, respectively, of the stator. The coils 17–20 are connected in a bridge type circuit as shown in FIGS. 1 and 4, a pair of input terminals at two ends of the coils 18 and 19 being supplied with a balanced or push-pull alternating voltage from a center-tapped transformer 22 coupled to a source 23 of alternating supply voltage of 400 cycles./sec., for example. The bridge type circuit in which the pick-off coils are connected and the operation of the pick-off circuit are similar to that shown and described in the aforementioned copending U.S. application 460,001.

A suitable output load for the device, not shown, is connected between a terminal 24 (coupled to two connected ends of the pair of coils 17 and 20) and a terminal 25 (coupled to a grounded centertap point of transformer 22). An output signal voltage is provided between terminals 24—25 whose amplitude is a function of the extent of unbalance of the bridge type circuit caused by changing the reluctances of the magnetic paths for the coils 17–20 when the armature 16 is angularly displaced from a null position whereat the impedances of coils 17–20 are substantially equal to each other.

The stator of the pick-off device consists of a plurality of substantially identical thin laminations of highly permeable magnetic material having a configuration generally as shown in FIG. 1. The laminations are joined together by cement and/or bolts, not shown, through four apertures 25 therethrough. The axes of the four arms or poles 11–14 of the stator are angularly spaced from each other by 90° about the axis of the pick-off device. Inner ends 26–29 of the arms or poles 11–14, respectively are curved and comprise pole faces conformal to a cylinder substantially concentric with the axis of rotor 16. The outline of the edges of each of stator pole faces 26–29 facing rotor 16 is square with each pole face having the same area as the other.

The rotor 16 is also comprised of plurality of substantially identical thin laminations of highly permeable magnetic material having a configuration similar to that shown in FIGS. 1 and 3. These laminations are joined together by cement or some other suitable binding agent and are skewed relative to each other so that a top lamination 31 shown in FIG. 3 is angularly displaced about the rotor axis by 45° from a bottom lamination 32. The rotor 16 is supported on a shaft 33 fitting tightly within an aperture through the center of the rotor laminations. A lock nut 34 threaded upon an enlarged portion 35 of the shaft 33 holds the rotor laminations firmly in place against a further enlarged portion 36 of the shaft 33 so that the pick-off rotor 16 is properly located therealong for coplanar support of the rotor 16 within the stator.

A housing 37 is provided for supporting the stator and rotor 16, the housing being divided into two parts 38 and 39 containing first and second coaxial ball bearings 41 and 42, respectively. One end of the rotor shaft 33 on one side of the rotor 16 fits tightly with the bearing 42 for rotation therewith and is forced therein until the lower end of the enlarged portion 36 of the shaft 33 is in abutment with an upper portion of a rotatable part of the bearing 42. A portion of the rotor shaft 33 on the other side of the rotor 16 fits tightly within the bearing for rotation therewith, the upper end of enlarged portion 35 of the shaft 33 abutting a lower portion of the rotatable part of the bearing 41 when the two housing parts 38 and 39 are clamped together.

Four bolts through four pairs of opposing sleeves disposed around and affixed to the two parts 38 and 39 of housing are provided for holding them together. One of the bolts 43, a nut 44 and one pair of opposing sleeves 46 and 47 through which the bolt 43 fits appears in the view of the device shown in FIG. 2.

The stator of the pick-off device is rigidly held between inner shoulders 48 and 49 of the housing parts 38 and 39, respectively, when the device is assembled. Four screws 51–54 are threaded through an annular portion of housing part 38 at angularly spaced points therearound for supporting the pick-off stator, the stator having a slightly smaller diameter than the diameter of the aforementioned annular portion of part 38. Screws 51–54 are adjustable and are employed to provide for lateral displacement of the stator with respect to the housing 37 and rotor 16 for electrical centering of the device, i.e. relative location of the stator and rotor pole faces so that when the rotor 16 is angularly located at a predetermined null position the impedances of coils 17 and 19 are equal and the impedances of coils 20 and 18 are equal. Centering might be necessary for counteracting inhomogeneities in the coils 17–20 or stator poles 11–14 which might otherwise prevent an optimum null voltage output from being obtained.

It can be seen from FIGS. 1–3 that the rotor 16 has two pole face means 51 and 52 which are disposed generally opposite the pair of stator pole face means 26—27 and the pair of stator pole face means 28—29, respectively, for the rotor position illustrated in FIG. 1. Angularly spaced edges 53 and 54 of the rotor pole face means 51 transverse the axis of the device are skewed in one direction by 45° relative to the rotor axis. Angularly spaced edges 55 and 56 of the other rotor pole face means 52 are skewed in an opposite direction relative to the rotor axis by 45°. The outlines of the edges of the rotor pole faces 51 and 52, respectively, are substantially rhombic with the areas of the rotor pole faces 51—52 being equal to each other. A null condition for the device obtains when each of the skewed rotor pole face edges 53–56 is substantially completely opposite a stator pole face so that substantially equal areas of the stator pole faces 26–29 are covered by the rotor pole faces 51—52 and the reluctances of the coils 17–20 are substantially equal to each other. Thus, the bridge type circuit of which the coils 17–20 are a part is balanced.

In operation of the pick-off device, assume that a balanced push-pull alternating voltage $V_1$—$V_2$ is supplied between the input ends of the pick-off coils 18 and 19 from the push-pull transformer illustrated in FIG. 1. If the aforementioned rotor 16 is located in its null position as aforedescribed, the sum of the inductive impedances of coils 17 and 19 will equal the sum of the inductive impedances of the coils 18 and 20. Thus, the bridge type circuit of pick-off coils 17–20 as seen in FIG. 1 and in the schematic diagram of FIG. 4 is balanced and a null voltage output is provided between the terminals 24 and 25.

Assume that the pick-off rotor 16 is coupled to an angularly movable element, not shown, whose relative position with respect to a null position is desired to be indicated by a signal voltage output. As the rotor 16 is angularly displaced with respect to the stator pole faces 26–29 by rotation of such an element, the impedances of the pick-off coils 17–20 are changed. Note that the impedances of opposite coils 18 and 20 are always changed by equal increments in the same direction while the impedances of the pick-off coils 17 and 19 are changed by equal increments in the same direction opposite that for the pick-off coils 18 and 20. Thus, the bridge type circuit of coils 17–20 is unbalanced and an output signal voltage is provided between the terminals 24 and 25 whose amplitude is a function of the angular rotor position. It has been found that the amplitude of the signal voltage output approximates a sine wave function of rotor displacement, being at a null each time two substantially equal areas of each of the rotor pole faces 51—52 are opposite the pole faces of one pair or the pole faces of another pair of stator pole faces 26–29. The phase of the aforementioned signal voltage reverses whenever the rotor position changes from one side to the other of any null position as aforedescribed. It can readily be seen that four different null positions are incurred over a complete rotation of 360° of the rotor 16.

When used as a pick-off device, the range of rotor displacement would be limited by suitable means, not shown, to ±45° from one rotor null position. This will give a non-redundant A.-C. signal voltage output whose amplitude is an unambiguous function of the extent of rotor displacement from a null position and whose phase reverses by 180° when the rotor displacement is changed from one side to the other of said null position.

Figure 6:
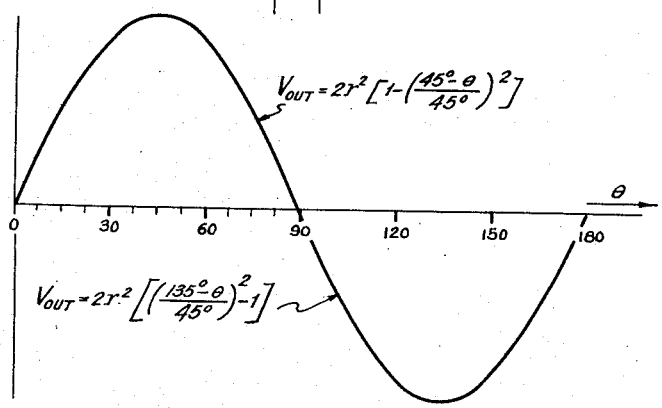
FIG. 6 is a graph of the amplitude of the output signal voltage derived from the pick-off device of FIGS. 1 and 2 as a function of angular rotor position relative to the stator.

In order to more clearly see how the pick-off device provides an output voltage signal whose amplitude is an approximate function of a sine wave, reference should be made to FIGS. 5 and 6. FIG. 5 shows, in developed form, the stator pole face means 26–29 and rotor pole face means 51—52 with FIGS. 5a–5d illustrating various positions of the rotor relative to the stator within a 180° range of clockwise rotor 16 displacement from a rotor null position whereat the skewed rotor pole face edges 53, 54, 56 and 55 are opposite stator pole faces 26–29, respectively.

As is shown in FIG. 5, each stator pole face is square being "r" units long and separated by the same length from the next adjacent pole face. Each of the pole faces 51 and 52 of rotor 16 has a length of $2r$ units and a width or thickness of "r" units as shown in FIG. 5. Described in degrees, each stator pole face is 45° long so that $r=45°$ in angular measure.

In FIG. 5, FIG. 5(a) represents one position for the rotor 16 displaced by $\theta$ degrees to the right of a null position, $\theta$ being less than 45°. FIG. 5(b) shows the position of rotor 16 when $\theta$ is between 45° and 90°. FIGS. 5(c) and 5(d) shows the rotor position for angles of $\theta$ between 90 and 135° and between 135 and 180°, respectively, from the aforementioned null position. Since the output voltage signal of the device depends on the reluctance of the magnetic paths for each of the pick-off windings 17–20 through the stator and rotor poles and the air gaps between the pole faces thereof, it can be seen that this voltage designated by $V_{out}$ is a function of the net area of each stator pole face covered by an opposing pole face of the rotor 16. The voltage output will be a direct function of: $(A_{27}+A_{29})-(A_{26}+A_{28})$, where $A_{26}$ is the area of the stator pole face 26 covered by a rotor pole face and $A_{27}$, $A_{28}$, and $A_{29}$ are similarly defined. From the geometry of the pick-off device and from FIG. 5, it can be seen that $A_{27}=A_{29}$ and that $A_{26}=A_{28}$ for all rotor positions. The voltage $V_{out}$ of the device will therefore, be proportional to: $2(A_{27}-A_{26})$. It can be shown from a geometric analysis of FIG. 5 that the output voltage signal is:

$$V_{out}=2r^2\left[1-\left(\frac{45°-\theta}{45°}\right)^2\right]$$

when $\theta$ is between zero and 90° and $$V_{out}=2r^2\left[\left(\frac{135°-\theta}{45°}\right)^2-1\right]$$

for $\theta$ between 90° and 180°. The aforementioned equations for $V_{out}$ follow an approximate sine wave curve as shown in FIG. 6. Generally, if the device is used as a pick-off it would be adapted to provide a non-redundant output over a range of ±45° from a null position where $\theta=0°$.

Although the coils of the aforedescribed pick-off device have been shown and described as being connected in a bridge type circuit, it should be apparent to those skilled in the art that a pick-off device utilizing substantially the same stator and rotor could be constructed wherein coils disposed about the stator poles would comprise a transformer type circuit as shown and described on pages 355–366 of "Electronic Instruments," Vol. 21 of the Radiation Laboratory Series, for example. Furthermore, since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an electromagnetic device a bi-polar rotor that is supported within a four pole stator, said stator having one pair of pole faces which conform to and oppose one rotor pole face and another pair of pole faces which conform to and oppose the other rotor pole face, the angle subtended by the space between the poles of each pair of stator pole faces being equal to the angle subtended by each stator pole face, the angle subtended by each rotor pole face being twice as large as the angle subtended by each stator pole face, two of the edges of each rotor pole face being skewed relative to the edges of the faces of the opposing stator pole faces, the projection of each rotor pole face covering substantially equal triangular areas of the projections of the faces of a respective one of the pairs of said stator pole faces for a null position between said stator and rotor, the covered area of one opposing stator pole face of each pair being increased by an amount that equals the decrease in covered area of the other stator pole face of each pair as the rotor is displaced from its null position, whereby the difference between the covered areas of the stator pole faces of each pair follows a sinusoidal curve as a function of relative rotation between the rotor and stator.

2. The structure of claim 1 wherein the face of each stator pole subtends an angle of substantially 45 degrees and each of the spaces between the stator poles subtends an angle of substantially 45 degrees.

3. The structure of claim 2, wherein the projection of each stator pole face is substantially square and the projection of each rotor pole face is a parallelogram that has two oblique angles of 45 degrees.

References Cited in the file of this patent

UNITED STATES PATENTS

| | | |
|---|---|---|
| 2,457,165 | McNamee | Dec. 28, 1948 |
| 2,488,771 | Glass | Nov. 22, 1949 |
| 2,606,944 | MacCallum | Aug. 12, 1952 |
| 2,608,682 | Herr | Aug. 26, 1952 |
| 2,662,301 | Beach | Dec. 15, 1953 |
| 2,710,941 | Bonnell | June 14, 1955 |
| 2,719,930 | Lehde | Oct. 4, 1955 |
| 2,774,057 | Jones | Dec. 11, 1956 |